April 7, 1964   L. A. HOHMANN, JR., ETAL   3,128,351
REPERTORY DIALER
Filed March 2, 1960   10 Sheets-Sheet 1
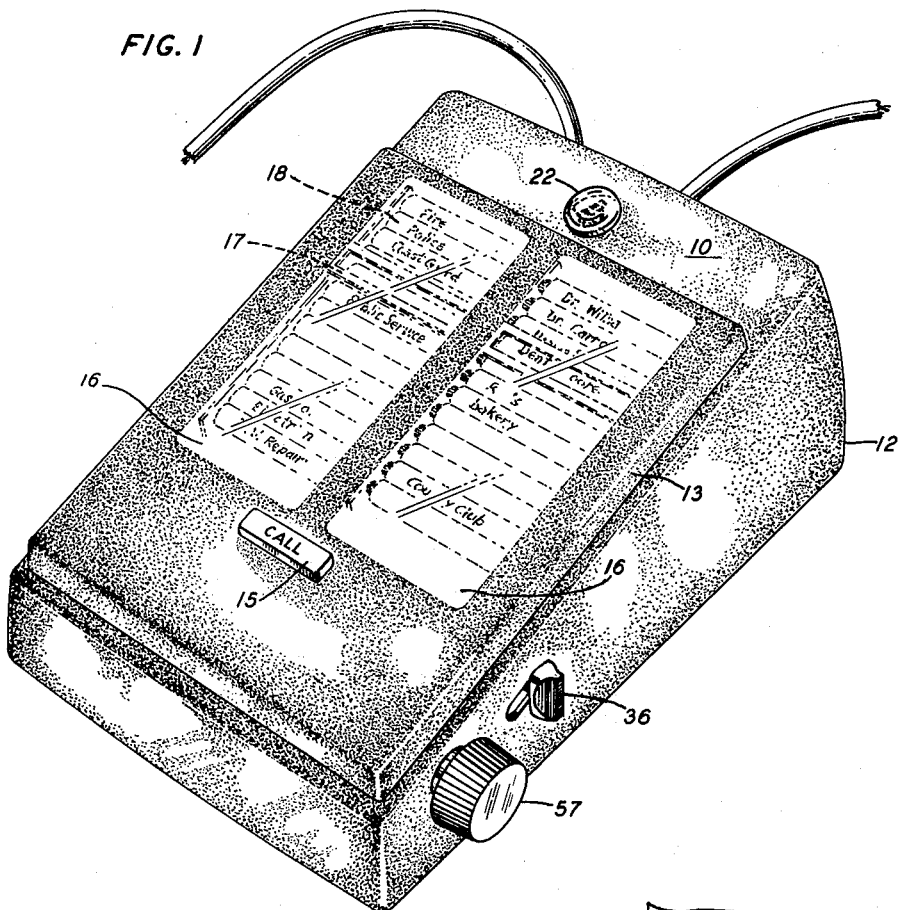
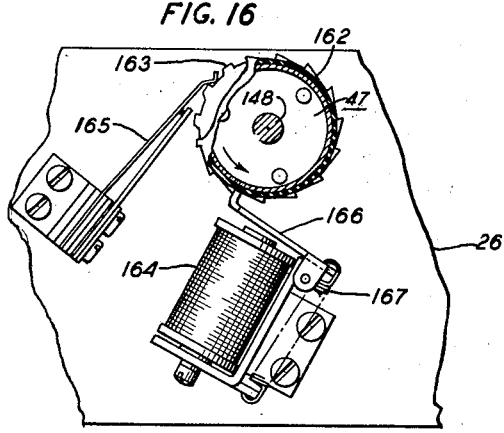
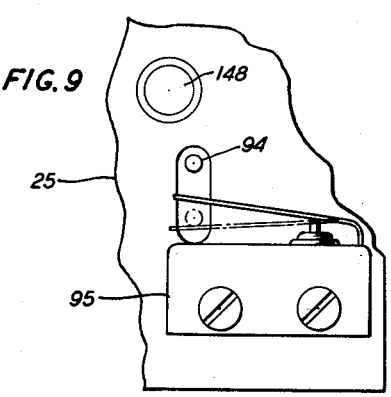
INVENTORS L. A. HOHMANN, JR.
F. W. KINSMAN
T. P. NENNINGER
BY John C. Morris
ATTORNEY

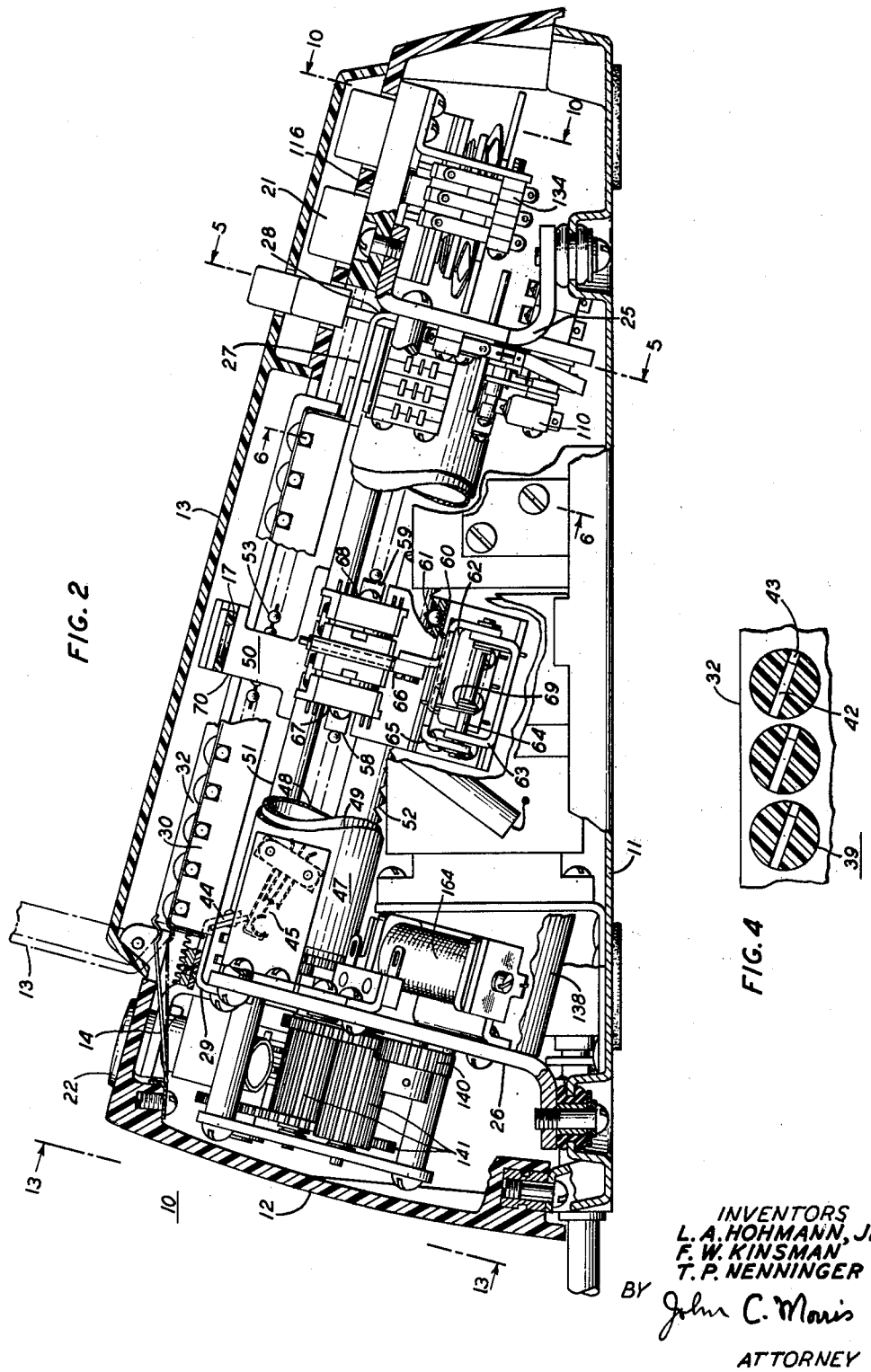

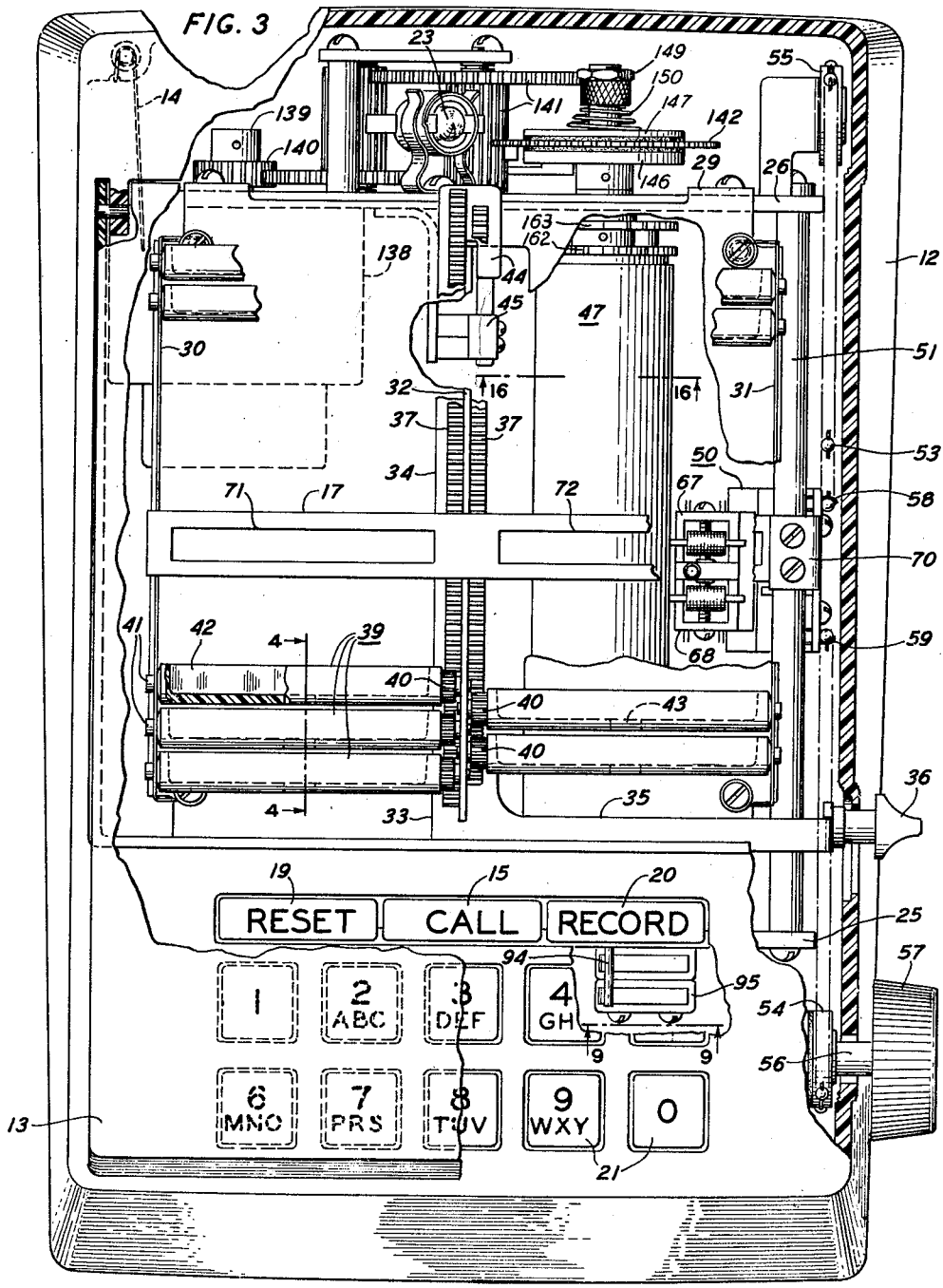

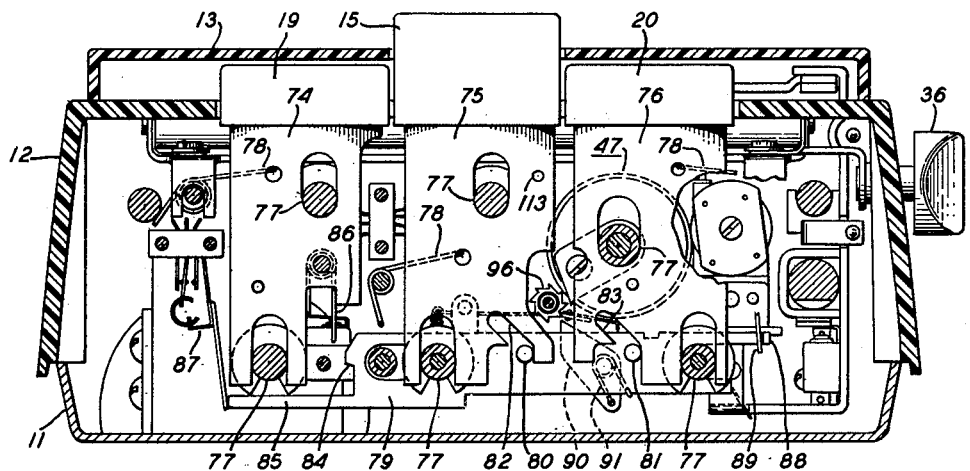
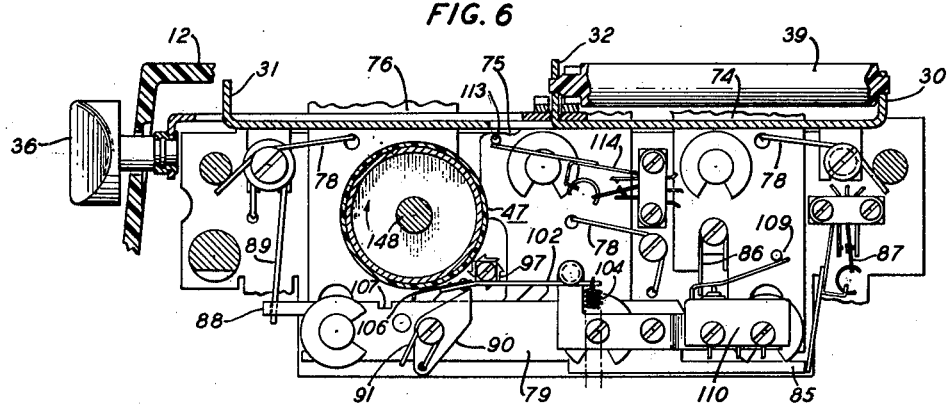
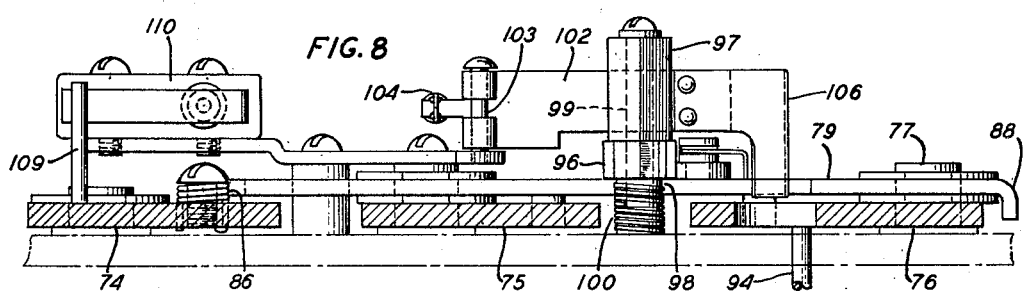

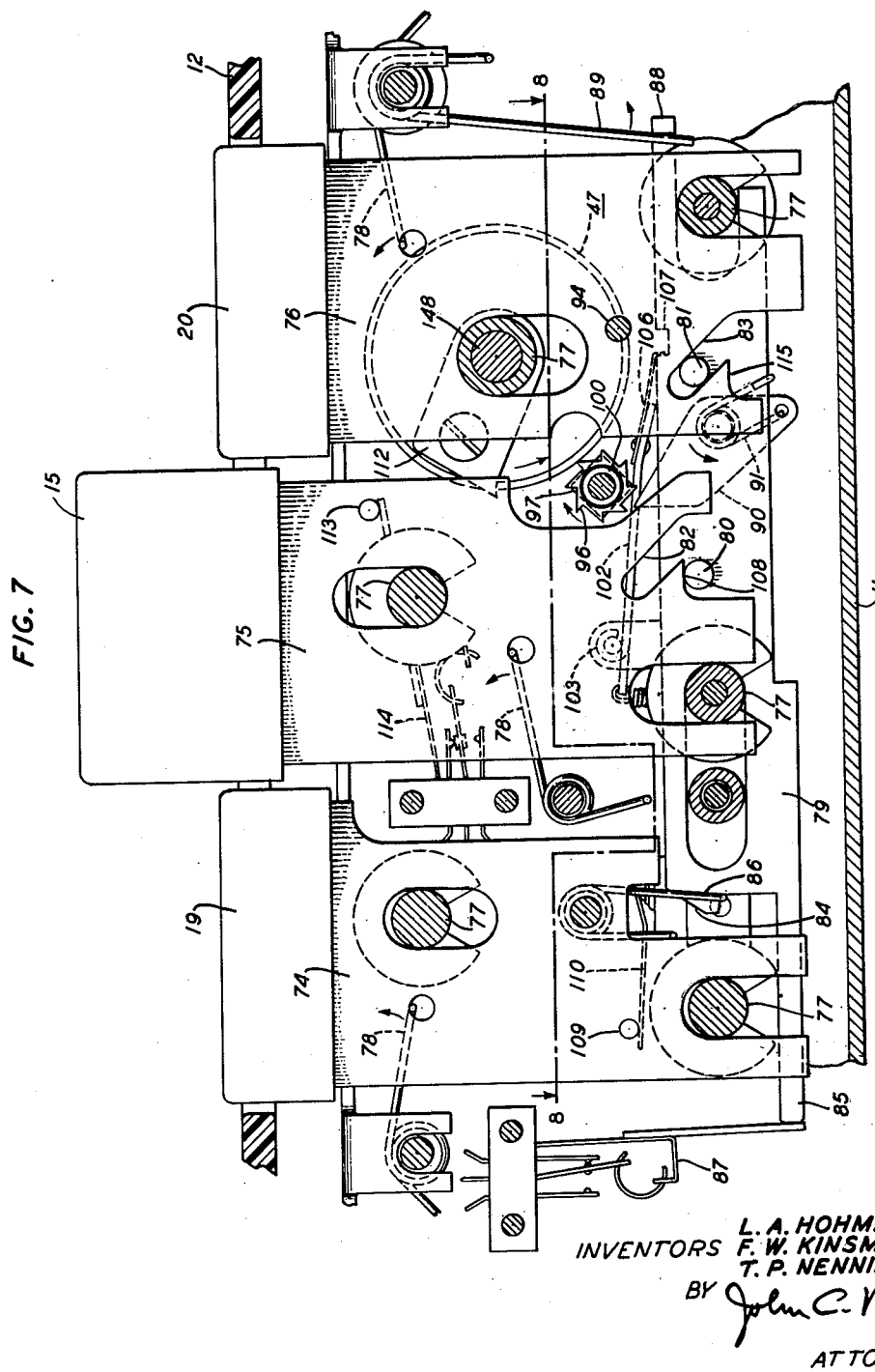

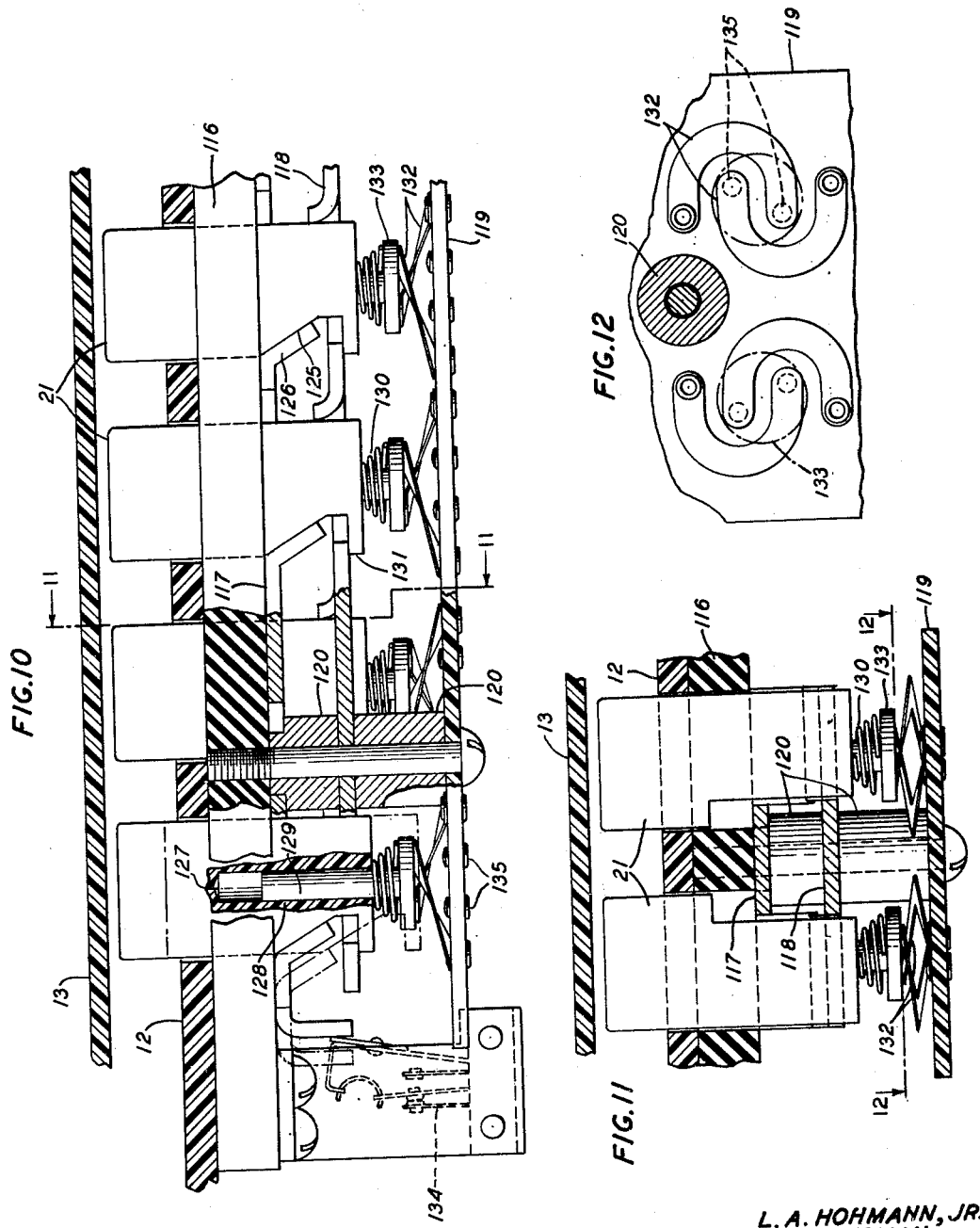

April 7, 1964  L. A. HOHMANN, JR., ETAL  3,128,351
REPERTORY DIALER

Filed March 2, 1960                                     10 Sheets-Sheet 7

INVENTORS  L. A. HOHMANN, JR.
F. W. KINSMAN
T. P. NENNINGER

BY John C. Morris

ATTORNEY

April 7, 1964  L. A. HOHMANN, JR., ETAL  3,128,351
REPERTORY DIALER

Filed March 2, 1960  10 Sheets-Sheet 8

INVENTORS L. A. HOHMANN, JR
F. W. KINSMAN
T. P. NENNINGER
BY
John C. Morris
ATTORNEY

INVENTORS L. A. HOHMANN, JR.
F. W. KINSMAN
T. P. NENNINGER

BY John C. Morris

ATTORNEY

United States Patent Office 3,128,351
Patented Apr. 7, 1964

1

3,128,351
REPERTORY DIALER
Lawrence A. Hohmann, Jr., Chatham, N.J., Frank W. Kinsman, Penfield, N.Y., and Theodore P. Nenninger, East Brunswick, N.J., assignors to Bell Telephone Laboratories, Incorporated, New York, N.Y., a corporation of New York
Filed Mar. 2, 1960, Ser. No. 12,440
8 Claims. (Cl. 179—90)

This invention relates to telephone calling devices and particularly to repertory dialers.

The repertory dialer is a telephone calling device having a storage medium that contains signaling information corresponding to the telephone numbers of frequently called subscribers. The user of the repertory dialer manually selects the subscriber that he desires to call and then operates a button or lever that causes the dialer to automatically transmit to the telephone central office the proper signaling information to connect the user to the selected subscriber.

As disclosed in the respective applications of A. E. Johanson, Serial No. 621,446, filed November 9, 1956, and issued on September 20, 1960, as Patent No. 2,953,-647, and J. H. Ham, Jr., et al. Serial No. 677,976, filed August 13, 1957, and issued on June 14, 1960, as Patent No. 2,941,043, repertory dialers have been developed employing a magnetic drum as the storage medium. The magnetic drum in cooperation with an electromagnetic transducer advantageously places the information stored in the repertory dialer completely within the control of the user. The user determines what subscribers he would like to be able to call by means of the dialer, and then he operates the dialer to record the telephone numbers of the subscribers on the magnetic drum. In addition, he replaces a number by simply recording a new number on the recording track of the number being replaced. Thus the user services his repertory dialer without the need of additional apparatus or the assistance of a telephone repairman.

The repertory dialers disclosed in the above-identified applications, however, record the signaling information on the magnetic drum in the form of direct current pulses similar to those transmitted by a conventional rotary dial. With the advent of electronic central office systems employing solid state and electronic switching devices, the emphasis in substation circuit design is toward compatible electronic systems for setting up a call, that is, systems generating alternating current signals. Alternating current signaling offers the advantage of speed in that only a short burst of a selected frequency need be transmitted to indicate a digit as opposed to the train of direct current pulses generated by a conventional dial. Thus the time required to transmit all the pulses which identify a station designation is greatly reduced, and the hold time on the receiving central office equipment is materially lessened. This serves not only to speed up telephone service, but also tends to reduce the amount of central office equipment needed to service a particular number of lines. In addition, alternating current signals when in the frequency of the voice range may be transmitted from end to end of a transmission channel just as voice frequencies are transmitted, facilitating such types of signal transmission as direct distance dialing.

A general object of this invention is to provide an improved repertory dialer.

A more specific object of this invention is to provide a repertory dialer that incorporates dialing means that may be used both to record alternating current signals on a multichannel storage medium and to transmit alternating current signals directly to a central office.

2

A further object of this invention is to provide a repertory dialer that does not operate when the transducer means for recording signals on the storage medium and reproducing signals previously recorded on the storage medium is not positioned in alignment with one of the channels of the storage medium.

A still further object of this invention is to provide a repertory dialer that automatically resets itself if during the recording of a number there is an interruption for a predetermined period of time.

These and other objects of the present invention are realized in an illustrative embodiment thereof wherein the repertory dialer comprises a magnetizable drum having, for example, fifty channels arranged side by side, each channel extending around the circumference of the drum. The drum is journaled for rotation and driven by a motor, and a pair of transducers are slidably positioned along the length of the drum whereby one or the other of the transducers is placed in juxtaposition with any of the fifty channels. A name display overlies the drum apparatus and includes a name indicator affixed to the transducers and indicative of their position along the magnetic drum. Manual controls position the name indicator over a particular name in the name display, and operating buttons condition the dialer to either record or transmit the signals corresponding to the telephone number of the particular name. A push button dial generates the desired signals, and various circuits operative in response to the operating buttons and the push button dial transmit the signals from the push button dial to the magnetic drum or transmit signals previously recorded on the magnetic drum to the central office.

A complete understanding of the invention and of these and other features and advantages thereof may be gained from consideration of the following detailed description taken in conjunction with the accompanying drawing wherein one embodiment of the invention is illustrated. It is to be expressly understood, however, that the drawing is for the purposes of illustration and description and is not to be construed as defining the limits of the invention.

FIG. 1 is a view in perspective of the repertory dialer of this invention;

FIG. 2 is a side view of the repertory dialer with the housing in cross section and with parts broken away to show the interior structure;

FIG. 3 is a top view of the repertory dialer with parts broken away to show the interior structure;

FIG. 4 is a sectional view of the name holders of the repertory dialer taken along line 4—4 of FIG. 3;

FIG. 5 is a sectional view taken along line 5—5 of FIG. 2 showing a front elevation of the operating assembly of the repertory dialer;

FIG. 6 is a sectional view taken along line 6—6 of FIG. 2 showing a rear elevation of the operation assembly;

FIG. 7 is an enlarged view of a portion of FIG. 5 showing the reset and record buttons in an operated condition;

FIG. 8 is a sectional view of the operating assembly taken along line 8—8 of FIG. 7;

FIG. 9 is a fragmentary front view taken along line 9—9 of FIG. 3 illustrating the actuation of the record switch by the record button;

FIG. 10 is an enlarged sectional view taken along line 10—10 of FIG. 2 showing a front elevation of the push button dial assembly of the repertory dialer;

FIG. 11 is a sectional view taken along line 11—11 of FIG. 10 showing a side elevation of the push button dial assembly;

FIG. 12 is a sectional view taken along line 12—12 of FIG. 11 showing the horseshoe shaped switch springs of the push button dial assembly;

FIG. 16 is a sectional view taken along line 16—16 of FIG. 3 showing a front elevation of the stepping mechanism of the repertory dialer;

Figure 18:
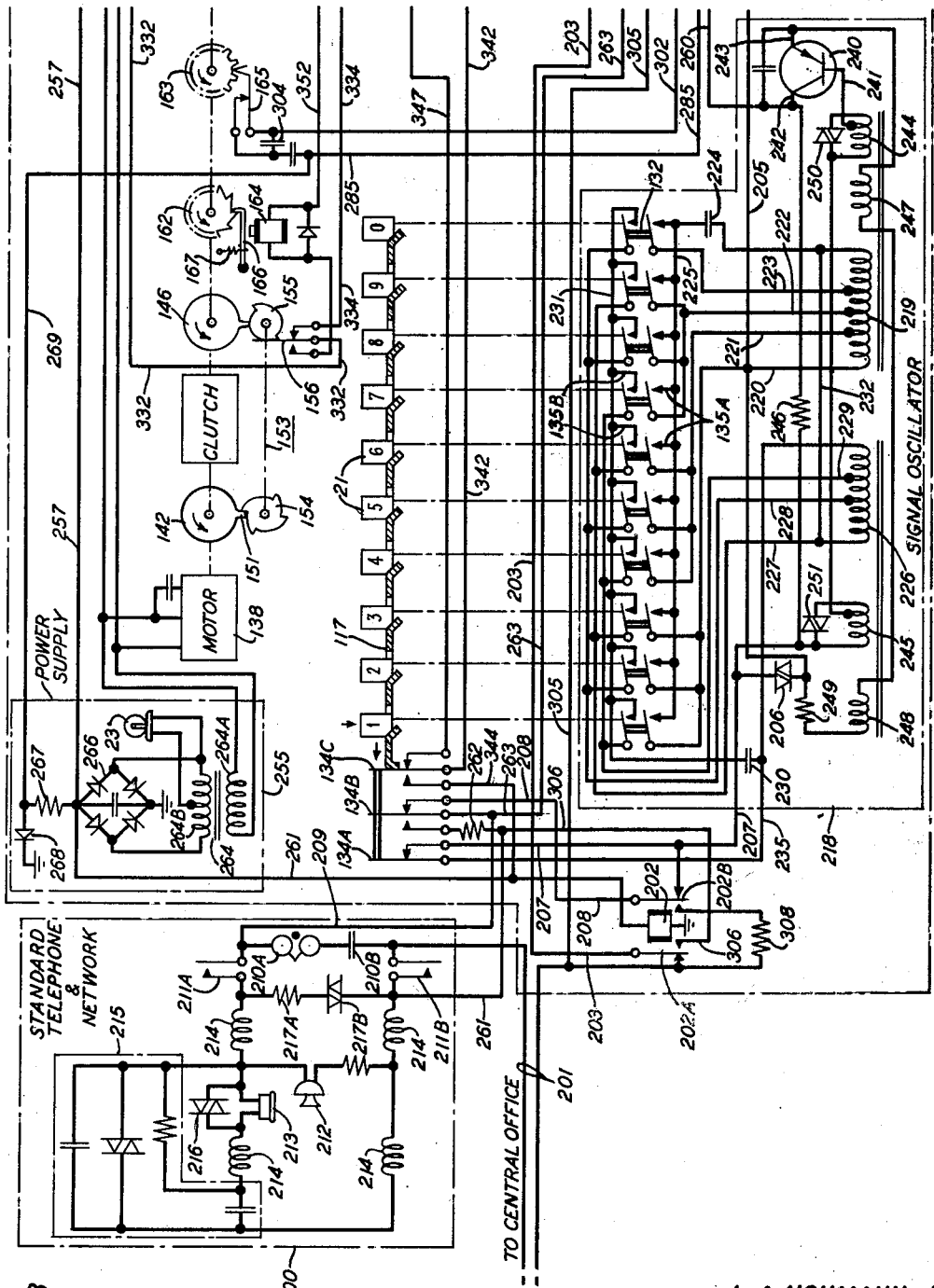
Figure 19:
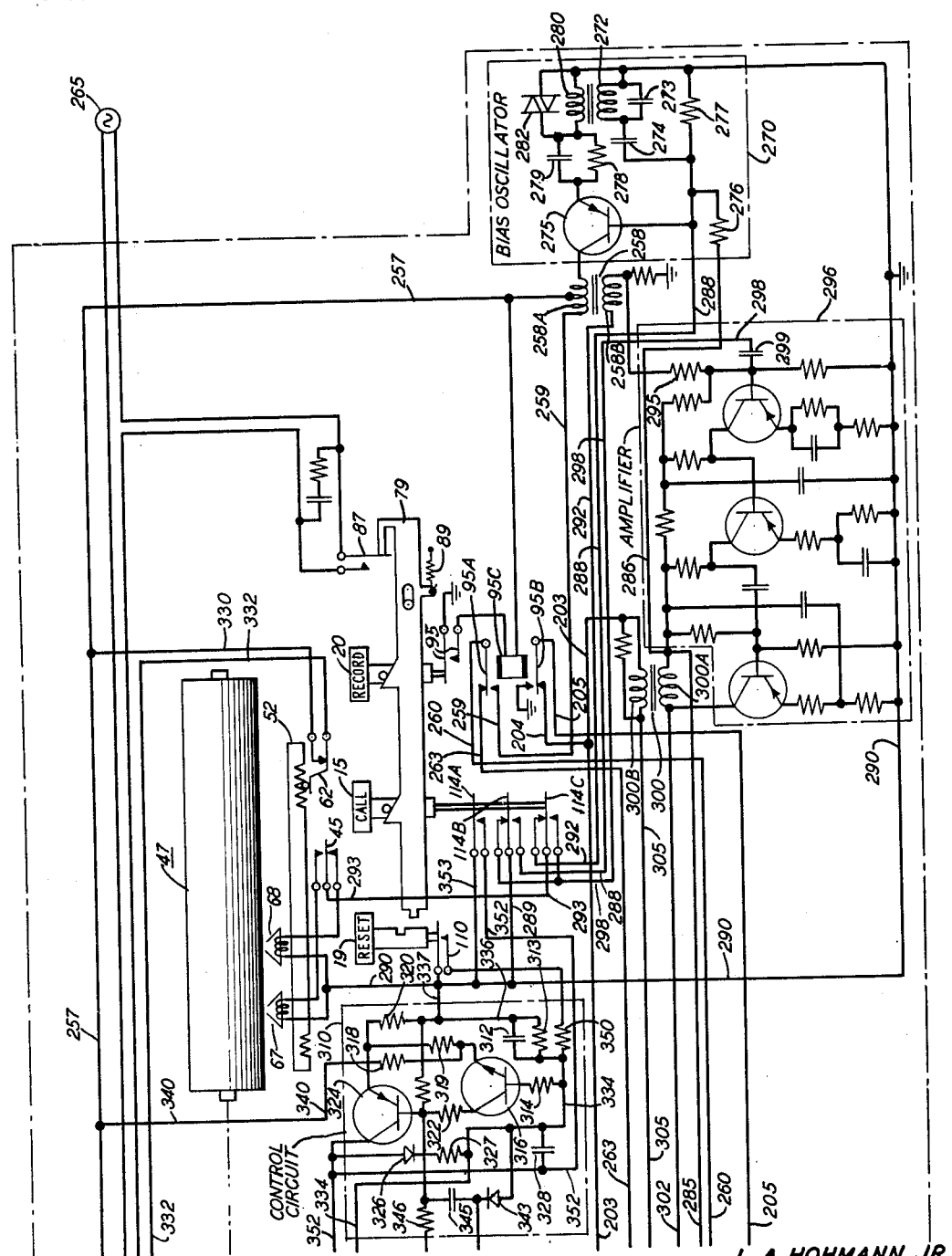

FIGS. 18 and 19 constitute an electrical schematic diagram of this invention.

Referring to FIGS. 1, 2 and 3 the repertory dialer of this invention includes a housing 10 comprising a base plate 11, a body 12, and a cover 13. The body is removably fastened to the base plate, and the upper end of the cover is pivotally mounted to the surface of the body. A wire spring 14, fastened to the upper left inside surface of the body, biases the cover toward a closed position. However, if the cover is raised to an upright position, as shown in phantom in FIG. 2, the trailing edge of the cover engages a bend in the spring, and the cover is held open. When the cover is in a closed position, a call button 15 extends through the cover, and transparent surfaces 16 in cover overlie a name indicator 17 positioned over a name display 18. When the cover is raised, a reset button 19, a record button 20, and a set of push buttons 21 are also exposed. The body of the housing is provided with a medallion 22 which is illuminated by lamp 23 when the repertory dialer is actuated by the operation of either the call or record button.

As shown in FIG. 2, a front plate 25 and a rear plate 26 are fastened to the base plate 11 at a spaced distance apart. Each plate extends upward from the base in a plane that is approximately perpendicular to the plane of the upper surface of the housing. Together the plates support the five mechanical assemblies that comprise the repertory dialer. These assemblies are: a name display assembly, a drum and carriage assembly, an operating assembly, a push button dial assembly, and a drive assembly. These assemblies will now be described.

*Name Display Assembly*

The name display assembly of the repertory dialer illustrated most clearly in FIGS. 2 and 3, comprises a mounting plate 27 having downturned front and rear legs 28 and 29, and up turned side portions 30 and 31. The front and rear legs are respectively fastened to the front and rear plates 25 and 26 so that the mounting plate lies in a plane that is parallel to and a spaced distance below the plane of the cover 13 when it is in a closed position. The upturned side portions have spaced apertures formed therein, and the apertures in one side portion are displaced a half space from the apertures in the other side portion. A center bar 32 is secured to the mounting plate midway between and parallel to the side portions, and apertures are formed in the center plate that are axially aligned with the apertures in both the side portions.

An L-shaped slider 33 is positioned atop the mounting plate 27. One leg 34 of the slider partially surrounds the center bar 32, while the other leg 35 of the slider extends perpendicularly to the bar. The slider is reciprocally movable a predetermined distance along the length of the bar under the control of a flipper knob 36 secured to the leg 35, and gear racks 37 are fastened to the top of the leg 34 on both sides of the bar.

A plurality of name holders 39, each of which has a pinion portion 40 at one end thereof and shaft portions 41 at both ends thereof, are positioned so that the pinion portions mesh with the racks 37, and the shaft portions extend through axially aligned apertures in the side portions 30 and 31 and the center bar 32. The apertures arrange the name holders into two columns, one of which is displaced a half name space from the other.

Each name holder 39 is provided with a name slot 42 that is adapted to receive two name cards back to back, each card bearing the name of a subscriber whose member is recorded in the repertory dialer. A second and considerably smaller slot 43 in each holder allows for the insertion of a device to dislodge the name bearing cards from the holder should it be desirable to make a change. The name holders are formed from some clear substance, such as an acrylic resin made of methyl methacrylate sold under the trademark "Lucite" and, as shown in FIG. 4, they may advantageously take the shape of a barrel, the convex surfaces of which serve to magnify the name on each card.

By moving the flipper knob 36 forward or backward through its complete length of travel, the racks 37, through engagement with the pinion portions 40 of the name holders 39, rotate the holder through one hundred eighty degrees. This then is the means by which one or the other of the names contained in the name holder is made visible. In addition to rotating the name holders, the movement of the flipper knob also causes a finger portion 44 that extends downward from the rear of the leg 34 of the slider 33 to operate a switch 45, the function of which is hereinafter described.

*Drum and Carriage Assembly*

The drum and carriage assembly of the repertory dialer, also shown in FIGS. 2 and 3, includes a magnetic drum 47, the front and back ends of which are respectively journaled in the front plate 25 and the rear plate 26. The drum comprises a tube 48 having a sleeve 49 positioned thereabout. It is desirable that the moment of inertia of the drum be kept as small as possible so that during the operation of the dialer the drum reaches the synchronous speed of its drive in the shortest possible time. In one specific embodiment, the drum comprises a one-thirty-second inch thick magnetic rubber sleeve mounted over an aluminum tube having an outside diameter of one inch, an inside diameter of .93 inch, and a length of approximately four and one-half inches.

Movable along the length of the magnetic drum 47 is a carriage 50 mounted on a rod 51 and a comb 52 that extend between and are fastened to the front and rear plates 25 and 26. The carriage is driven by an endless bead chain 53 that rides over rotatively mounted front and rear sprockets 54 and 55. The front sprocket is coupled through a shaft 56 to a selector knob 57, and rotation of the selector knob causes one or the other of two spaced beads in the chain, depending upon the direction that knob is rotated, to respectively engage a rear carriage finger 58 or a forward carriage finger 59 and thereby move the carriage up or down the magnetic drum.

The bottom surface of the comb 52 has spaced V-shaped notches cut therein, and a cantilever leaf spring 60 mounted on the carriage biases a ball detent 61 carried by the spring against the notches causing the carriage to tend to move in spaced increments. Should the carriage be positioned on a crown between notches, the spring is deflected, and a carriage switch 62 mounted on the carriage is operated by the deflected spring to electrically prevent rotation of the magnetic drum.

The bottom portion of the carriage 50 is provided with upturned arms 63 through which a pintle 64 extends, the longitudinal axis of the pintle being substantially parallel to the longitudinal axis of the magnetic drum 47. Pivotally mounted on the pintle is a bracket 65 to which is fastened a pin 66, the longitudinal axis of the pin being substantially perpendicular to the longitudinal axis of the magnetic drum. Transducer heads 67 and 68 are pivotally mounted on the pin, and a torsion spring 69 positioned around the pintle biases the bracket so as to bring the heads to bear against the magnetic drum. Because the longitudinal axes of the pin and pintle, respectively, extend perpendicular to and parallel to the longitudinal axis of the magnetic drum, the heads are self-aligning against the drum.

One end of the name indicator 17 is secured to an upward extending arm portion 70 of the carriage 50, the arm portion suspending the name indicator over the name display assembly. The name indicator is a flat elongated member having two rectangular apertures 71 and 72 formed side by side therein, each aperture being respectively positioned above one of the two columns of the name holders 39. When the carriage 50 is properly seated against a notch in the comb 52, one of the apertures 71 and 72 in the name indicator 17 frames a single name holder 39 in the name display.

As hereinbefore stated, each name holder contains two name bearing cards placed within the name holder back to back. One of the names is associated with the transducer head 67, and the other name is associated with the transducer head 68. In moving the flipper knob 36 to rotate the name holders and make one or the other of the names visible, the switch 45 is operated, connecting the transducer head associated with the visible name into the circuitry of the repertory dialer.

The notches in the comb 52 are spaced so that as the carriage 50 is moved along the magnetic drum 47 by the rotation of the selector knob 57, the name holder 39 framed by the name indicator 17 alternates back and forth between the two columns of the name display. In addition, the transducer heads 67 and 68 are located so that as the carriage is moved along the drum, one transducer head never occupies the same position on the drum that is occupied by the other transducer head. In one specific embodiment, the spacing between adjacent recording tracks is .080 inch, the spacing between the roots of adjacent notches in the comb is .160 inch, and the spacing between the axes of adjacent name holders in the same column is .320 inch.

*Operating Assembly*

Referring to FIGS. 5 and 6, the operating assembly of the repertory dialer comprises a reset plunger 74, a call plunger 75, and a record plunger 76, respectively associated with the reset button 19, the call button 15, and the record button 20. The plungers are slidably movable in a vertical direction on bearing members 77 that are mounted to the front plate 25, and the plungers are biased in an upward direction by wire springs 78. An advance bar 79 is positioned to the rear of the plungers and is movable transversely thereto. The advance bar has pins 80 and 81 that are respectively received by angled slots 82 and 83 in the plungers 75 and 76. The advance bar further has a shoulder portion 84 and an elongated finger portion 85 at one end thereof that respectively cooperate with a spring detent 86 mounted on the plunger 74 and a power switch 87 mounted on the front plate 25, and a finger portion 88 at the other end thereof that is engaged by a wire spring 89, the wire spring biasing the advance bar to the left as viewed in FIG. 6. A pawl 90 is pivotally mounted to the back side of the advance bar and biased, as viewed in FIG. 6, by a spring 91 so as to rotate easily in a clockwise direction but to resist rotation in a counter clockwise direction.

Turning now to FIGS. 7, 8, and 9, when the record button 20 is depressed, the downward movement of the record plunger 76 causes a pin 94 extending forwardly therefrom to actuate a record switch 95. The downward movement of the record plunger also causes the angled slot 83 therein to engage the pin 81 and cam the advance bar 79 to the left. As the advance bar moves to the left, the elongated finger portion 85 actuates the power switch 87, and the pawl 90 engages an eight tooth ratchet wheel 96. The ratchet wheel, which is seen most clearly in FIG. 8, has a square cam 97 and a sleeve member 98 fixedly secured to its respective sides, and all three are rotatably mounted about a shaft 99. A band clutch 100 is positioned around the sleeve member, and it permits the sleeve member and thereby the cam and ratchet, to rotate in a clockwise direction but prevents them from rotating in a counter clockwise direction.

An actuator arm 102, one end of which is pivotally mounted about a pin 103, is biased upwardly against the square cam 97 by a coil spring 104. When the advance bar 79 is in an unactuated condition, as illustrated in FIGS. 5 and 6, a flat side of the square cam 97 is presented to the actuator arm, and the arm is in a raised position. However, when the advance bar is actuated, as by the depression of the record button 20, the pawl 90 contacts and moves past the ratchet wheel 96 and rotates the ratchet and thereby the square cam forty-five degrees. An edge of the cam is thus brought to bear against the actuator arm, and the arm is moved to a downward position whereby a finger portion 106 thereof is placed into a notch 107 formed in the upper edge of the advance bar. The placement of the finger portion into the notch locks the advance bar in its leftward position. In addition, the pin 81 of the advance bar through engagement with the angled slot 83 of the record plunger 76 locks the plunger in a downward position.

With the record plunger 76 locked in its downward position and the advance bar 79 locked in its leftward position, the pin 80 of the advance bar is placed beneath a shoulder portion 108 of the call plunger 75, and the call button 15 cannot be depressed. However, the reset plunger 74 is still operable. The reset button 19 may be depressed, causing a pin 109 extending rearwardly therefrom to operate a reset switch 110 and causing the spring detent 86 mounted thereon to latch under the shoulder portion 84 of the advance bar.

The operation of the reset switch 110 by the depression of the reset button causes the repertory dialer to reset itself. The magnetic drum revolves in a counter clockwise direction as viewed in FIG. 7, and a pawl 112 fastened to the forward face of the drum engages the ratchet wheel 96 and rotates it and the square cam 97 an additional forty-five degrees. A flat side of the cam is again presented to the actuator arm 102, and the coil spring 104 pivots the actuator arm 102 upward, disengaging the finger portion 106 from the notch 107 in the advance bar 79. The wire spring 89 moves the advance bar to the right, opening the power switch 87, and the wire springs 78 associated with the depressed plungers move the plungers upward, disengaging them from their respective switches.

If the call button 15 rather than the record button 20 is depressed, a similar sequence occurs as when the record button is depressed. The downward movement of the call plunger 75 causes a pin 113 extending rearwardly therefrom to actuate a call switch 114. In addition, the downward movement of the call plunger causes its angled slot 82 to engage the pin 80 and cam the advance bar 79 leftward. The elongated finger portion 85 operates the power switch 87, and the pawl 90 rotates the ratchet 96 and thereby the square cam 97 through forty-five degrees. The rotated cam presses the actuator arm 102 downward placing the finger portion 106 of the actuator arm in the notch 107 of the advance bar. The advance bar is locked in its leftward position, and the call plunger is locked in its downward position. Furthermore, the pin 81 on the advance bar is positioned beneath a shoulder portion 115 of the record plunger, preventing the record plunger from being depressed.

The operation of the power switch and the call switch causes the magnetic drum to rotate through a complete revolution. The pawl 112 on the drum engages the ratchet 96 and rotates it an additional forty-five degrees, unlatching the advance bar and the call plunger in the manner previously described and placing the repertory dialer in an unactuated condition.

Push Button Dial Assembly

The push button dial assembly, shown in FIGS. 2, 3, 10, 11, and 12 includes a top plate 116 secured to forwardly extending fingers of the front plate 25 and positioned beneath a forward surface of the body 12 of the housing 10. A latch plate 117, a stationary plate 118, and a printed circuit board 119 lie in planes parallel to the top plate, the stationary plate and printed circuit board being mounted spaced distances from the top plate by spacers 120. A spaced array of push buttons 21 extend through apertures in the body, top plate, slide plate, and stationary plate. Each push button is provided with an inclined cam face 125 that rests on a mating inclined finger 126 of the slide plate and a central aperture 127 that receives a stem portion 128 of a plunger 129. A conical compression spring 130, positioned about the stem portion of each plunger, biases its associated push button upwardly, the upward motion of each push button being limited by the engagement of a lip 131 against the bottom of the stationary plate 118. A pair of horseshoe shaped switch springs 132 are respectively positioned below a head portion 133 of each plunger. One end of each switch spring is secured to the printed circuit board while the other end extends upwardly therefrom supporting the plunger a spaced distance from the printed circuit board.

When a push button 21 is depressed, the engagement of the cam face 125 with the mating inclined finger 126 translates the vertical motion of the button into horizontal movement of the latch plate 117, and the latch plate operates a push button controlled switch 134. In addition, the depression of the push button deflects the upwardly raised ends of the switch springs 132 downward causing them to close on contacts 135 that are mounted in the printed circuit board 119. Further depression of the push button after the switch springs have been deflected against the contacts is taken up by the conical compression spring 130.

When the push button is released, the flexed switch springs 132 and the compressed compression spring 130 cooperate to return the push button to its normal position. Similarly, the operated switch 134 and a biasing spring (not shown) cooperate to return the latch plate 117 to an unoperated position.

Drive Assembly

Figure 13:
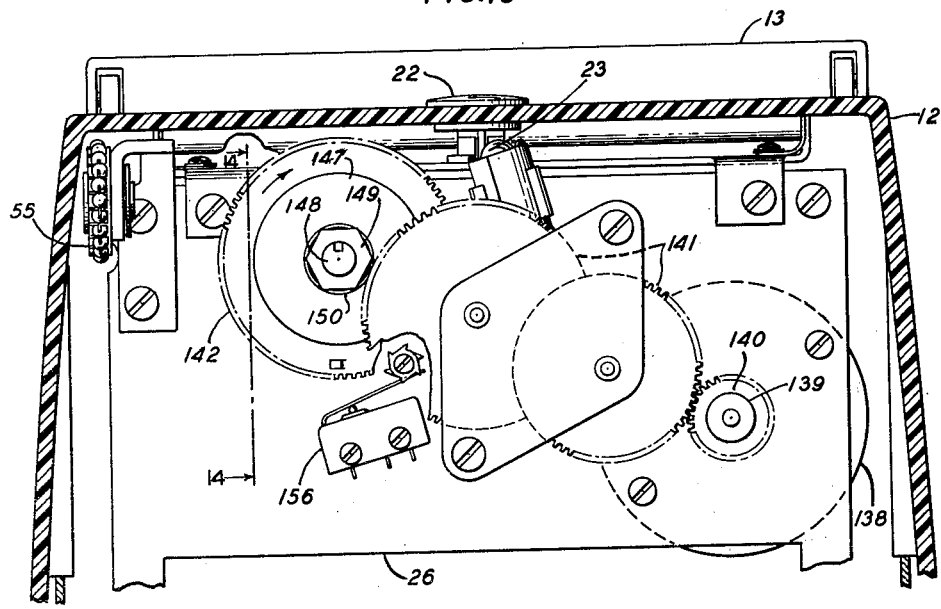
FIG. 13 is a sectional view taken along line 13—13 of FIG. 2 showing a rear elevation of the drive assembly of the repertory dialer.

Referring to FIGS. 2, 3, and 13, the drive assembly of the repertory dialer is mounted on the rear plate 26. The assembly includes a motor 138 having a drive shaft 139 on which is mounted a driving gear 140, the driving gear being coupled through a gear train 141 to a driven gear 142. The gear train ratio between the driving gear and the driven gear is determined by several factors. Among these are the minimum allowable circumferential speed for the recording medium, the maximum time allowed for the recording of each digit, the diameter of recording medium, and the motor speed. In one specific embodiment the minimum recording speed is found to be 2.75 inches per second, the digit length selected is .080 second, the diameter of the magnetic drum is 1.25 inches, and the motor used in a condenser start and run synchronous motor with a torque output of 0.37 inch ounce at eighteen hundred r.p.m. with 8.5 watts input from a one hundred fifteen volt alternating current line. In this embodiment the gear ratio established between the driving and the driven gears is 37.5 to 1. The pitch of the gears is advantageously chosen so as to obtain the maximum distance between the motor and the transducer heads 67 and 68, thereby minimizing the pick up of stray alternating current motor fields.

Figure 14:
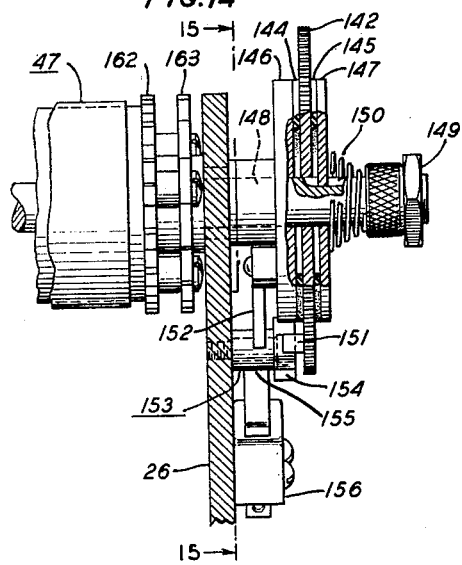
FIG. 14 is an enlarged sectional view taken along line 14—14 of FIG. 13 showing a portion of the drive assembly with parts broken away for greater clarity.

As most clearly shown in FIG. 14, energy dissipating washers 144 and 145 are positioned to the left and to the right of the driven gear 142, and clutch plates 146 and 147 are respectively positioned to the left and to the right of the washers. The driven gear and the clutch plates are positioned on a shaft 148, and the shaft is fixedly coupled to the magnetic drum 47. The driven gear is journaled on the shaft while the clutch plates are secured to the shaft. Thus when the gear train is in motion due to the energization of the motor and the magnetic drum is, in a manner hereinafter described, prevented from rotating, the driven gear rotates about the shaft slipping between the washers. However, when the magnetic drum is free to rotate, the washers transmit the torque of the driven gear to the clutch plates causing the shaft and thereby the magnetic drum to rotate. A nut 149 threaded on the end of the shaft, bears against a conical compression spring 150 which in turn bears against the clutch plate 147. This clutch plate, the washers, and the driven gear are all axially movable along the shaft. So by changing the spring load on this clutch plate, the energy absorption of the clutch may be varied. In one specific embodiment it is found that for efficient dialer operation the clutch should transmit a minimum of approximately one hundred gram inches of torque.

Figure 15:
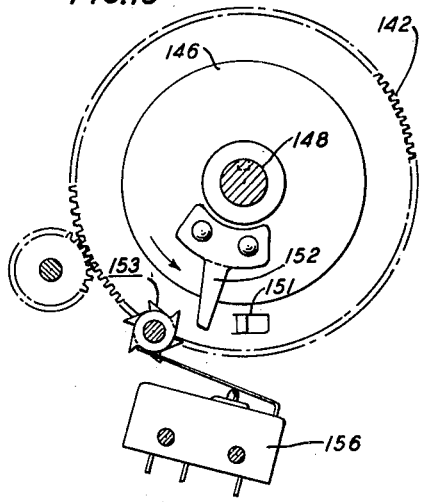
FIG. 15 is a sectional view taken along line 15—15 of FIG. 14 showing a front elevation of the delay mechanism of the repertory dialer.

Referring now to FIGS. 14 and 15, a finger portion 151 extends forwardly from the driven gear 142 and a pawl 152 is fastened to the forward face of the clutch plate 146. The finger portion and the pawl engage a ratchet wheel 153 positioned therebelow. The ratchet basically has six teeth, but it is modified in the following manner. For approximately one-third of its axial length it is a four-tooth ratchet, two teeth one hundred and eighty degrees apart having been removed. This portion is designated 154 and the teeth thereon lie in the path of the finger portion 151. For the remainder of the ratchet wheel's axial length the two teeth removed from the portion 154 are present, and the four teeth present on the portion 154 are removed. This two-tooth portion is designated 155, and the teeth thereon lie in the path of the pawl 152.

When the motor 138 is energized, the driven gear 142 commences to rotate. As the finger portion 151 on the driven gear sweeps past the ratchet 153, it engages a tooth on the portion 154 and rotates the ratchet sixty degrees. Thus in two revolutions it rotates the ratchet through one hundred and twenty degrees, and thereby positions one of the teeth on the portion 155 so as to activate a delay switch 156. The actuation of the delay switch removes one of the electrical stops that prevent the magnetic drum 47 from rotating, the purpose of the delay switch being to provide sufficient time, in this case two revolutions of the driven gear, for the motor to stabilize at its synchronous speed before motion of the magnetic drum 47 begins. The third and subsequent revolutions of the driven gear do not rotate the ratchet because the tooth on the portion 154 that the finger portion would next engage is missing.

When the magnetic drum 47 and thereby the clutch plate 146 rotate through a complete revolution, the pawl 152 engages a tooth on the portion 155 of the ratchet wheel 153 and rotates it through sixty degrees. The ratchet wheel is thereby positioned so that a tooth on the portion 155 no longer actuates the delay switch, and the teeth on the portion 154 are again in a position to be engaged by the finger portion of the driven gear.

Turning now to FIGS. 14 and 16, it is seen that fixedly secured to the back end of the magnetic drum 47 is a stepping cam 162 and a blanking cam 163 respectively associated with a stepping solenoid 164 and blanking contacts 165. The teeth on the stepping cam divide the circumference of the magnetic drum into equal increments, each increment being the distance allowed for the recording of a signal representing one digit of a subscriber's telephone number. Normally an armature 166 of the stepping solenoid is biased by a spring 167 so as to engage a tooth on the stepping cam and prevent the magnetic drum from rotating. However, once the delay switch 156 has been actuated, the stepping solenoid may be energized to remove the armature from the stepping cam and permit the magnetic drum to rotate through one increment, as when a signal digit is recorded on the drum, or to rotate through a complete revolution, as when the repertory dialer transmits a complete sequence of digits. In one specific embodiment the stepping cam is formed with fifteen teeth dividing the circumference of the cam into twenty-four degree increments.

Each time a single digit is recorded on the magnetic drum, the stepping solenoid is operated to allow the magnetic drum to rotate through one increment. However during an initial portion of the drum's rotation, it is not moving at the synchronous speed of the drive. The portion of the signal recorded while the drum is reaching the synchronous speed will not be at the frequency associated with the particular digit because the change in speed produces a frequency shift. To prevent the transmission of this inaccurate portion of the signal to the telephone central office during the call cycle, the blanking contacts 165 in cooperation with the blanking cam 163 blank out an initial portion of each signal. In one specific embodiment the blanking contacts and the blanking cam are designed to blank the initial three-eighths of the signal for each digit, the remaining five-eighths of the signal being transmitted to the central office.

Electrical Circuitry

Referring now to FIGS. 18 and 19, an electrical schematic diagram of the repertory dialer is shown. Associated with the repertory dialer is a standard telephone network 200. This network may be in a subset used in conjunction with the dialer or it may be incorporated along with a handset into the dialer itself. The network is connected to a telephone central office by a pair of telephone line conductors 201. The central office includes a central office battery and a multifrequency calling signal register of the type disclosed in the application of coinventors L. A. Meacham and L. Schenker, Serial No. 743,434, filed June 20, 1958, and issued on January 29, 1963, as Patent No. 3,076,059, or a signal translator of the type disclosed in the application of L. A. Hohmann, Jr., Serial No. 697,613, filed November 20, 1957, and issued on April 19, 1960, as Patent No. 2,933,563.

One side of the telephone line 201 is connected directly to the telephone network while the other side of the line is connected to the telephone network through a transfer switch 202A, conductors 203 and 204, a record switch 95B, a conductor 205, a voltage regulating diode 206, a conductor 207, a transfer switch 202B, a conductor 208, the push button switch 134B and a conductor 209. Connected across the line conductors 201 is a conventional telephone ringer 210A and its associated capacitor 210B, and connected in series with the line conductors are hook switches 211A and 211B which serve to connect the speech and calling circuits to the line 201 upon the lifting of a telephone handset associated with the repertory dialer.

The speech circuit is of the conventional antisidetone type including a transmitter 212, a receiver 213, induction coils 214, a line impedance balancing network 215, a click suppressor varistor 216, and a shunt impedance branch for telephone loop length compensation that includes a resistor 217A and a diode 217B. When the handset associated with the telephone network is lifted from its cradle, both hook switches 211A and 211B close, and the speech circuit is effectively placed across the telephone line 201. The speech circuit is substantially unmodified from conventional telephone sets, and the only difference in connections is the presence of the transfer switches 202A and 202B, the record switch 95B, the diode 206, and the push button switch 134B. These elements do not affect speech transmission or reception since the relay and switches are unoperated during speech transmission or reception, and the diode 206 introduces only an insignificant drop in level.

The signaling circuit, which is almost identical to that described in the joint application of L. A. Meacham and F. West, Serial No. 759,474, filed September 8, 1958, is a signal oscillator 218 that provides multifrequency signals for digit information. The originating elements of the signal oscillator comprise a pair of resonant circuits, one of which is designed for a higher frequency level than the other. The first resonant circuit includes a winding 219 having taps 220, 221, 222, and 223 connected thereto at various points thereon. The winding is connected to a capacitor 224 and a bus 225, and the taps are individually connected to one or more of the switch springs 132. Similarly, the second resonant circuit includes a winding 226 having taps 227, 228, and 229 connected thereto at various points thereon. The winding is connected to a capacitor 230 and a bus 231, and the taps are individually connected to one or more of the switch springs 132. Each of the switch springs when operated engages an associated pair of contacts 135A and 135B, respectively connected to the buses 225 and 231. The two resonant circuits are connected in series by means of a conductor 232.

The resonant circuits are connected to one side of the diode 206 through the conductor 205, and to the opposite side of the diode through a conductor 235, the push button switch 134A, and the conductor 207. In addition, the resonant circuits are coupled electromagnetically to a transistor amplifier, the active element of which is a transistor 240 having a base electrode 241, a collector electrode 242, and an emitter electrode 243. The base electrode is connected through a pair of series windings 244 and 245 to one side of the diode 206, the collector electrode is connected through a resistor 246 to the same side of the diode, and the emitter electrode is connected through a pair of series windings 247 and 248 and a resistor 249 to the opposite side of the diode. The resistor 246 serves to pass current through the diode to establish its nominal conducting voltage and to form a load in parallel to reduce the variation of signal output voltage with line impedance. The base circuit windings 244 and 245 are respectively shunted by diodes 250 and 251 which serve to regulate the amplitudes of the voltages across the base windings.

Energy derived from the voltage across the diode 206 is stored in the windings of the resonant circuits during the time that the push buttons 21 are unoperated. When the hook switches 211A and 211B are closed by the lifting of the telephone handset and the record button 20 is not depressed, the voltage across the diode is supplied from the central office, one side of the telephone line 201 being connected to the diode through the telephone network 200, the conductor 209, the push button controlled switch 134B, the conductor 208, the transfer switch 202B, and the conductor 207, and the other side of the telephone line being connected to the diode through the transfer switch 202A, the conductor 203, the record switch 95B, and the conductor 205. However, when the record button is depressed, the voltage across the diode is supplied by a power supply 255, hereinafter described. The depressed record button connects the solenoid 95C between the power supply and ground. The solenoid is thereby energized, and the record switches 95A and 95B are operated. The power supply is thereby connected to the diode through a conductor 257, a primary winding 258A of a transformer 258, a conductor 259, the operated record switch 95A, a conductor 260, and the resistor 246, and the diode is connected to ground through the conductor 205 and the operated record switch 95B. The power supply when energized also provides voltage for a solenoid 202 through a conductor 261. The energized solenoid operates the transfer switches 202A and 202B so as to disconnect the signal oscillator from the central office and short out the telephone network.

Upon depression of any one of the push buttons 21, the switch spring 132 associated with the operated push button engages the pair of contacts 135A and 135B associated with the contact spring. The capacitors 224 and 230 are thereby shunted across particular portions of the windings 219 and 226, establishing a unique pair of resonant frequencies for the digit designated by the operated push button. In addition, depression of the push button causes the latch plate 117 to operate the push button controlled switch 134 so as to open the switch 134A and transfer the switches 134B and 134C. The opening of the switch 134A interrupts the connection between the resonant circuits and the diode 206 and induces a damped oscillation in each of the resonant circuits which shock excites the transistor amplifier into operation in the frequencies established by the operated push button. The transfer of the switch 134B connects the transistor amplifier across the telephone lines 201 and at the same time shunts a low resistance across the telephone network 200 by connecting one side of the telephone line to the transistor amplifier through the closed hook switch 211B, a conductor 261, a resistor 362, a conductor 263, the record switch 95A, and the conductor 260, the other side of the telephone line being connected to the transistor amplifier through the transfer switch 202A, the conductor 203, the record switch 95B, and the conductor 205. The function of the switch 134C is hereinafter explained.

If the power for the signal oscillator is supplied from the central office, the generated signals are sent directly to the central office. If, on the other hand, the power for the signal oscillator is supplied by the power supply 255, the generated signals are sent to the primary winding 258A of the transformer 258 where they are mixed with the signals generated by a bias oscillator 270.

The power supply 255 includes a transformer 264 having a primary winding 264A and a secondary winding 264B. The primary winding is connected through the power switch 87 to a standard one hundred and ten volt, sixty cycle power source indicated by 265, the switch being closed when the advance bar 79 is actuated leftward by either the call button 15 or the record button 20 being depressed. The secondary winding 264B is connected to a full wave bridge rectifier 266. The bridge rectifier provides an unregulated negative thirty volts to the conductors 257 and 261, while a resistor 267 and a diode 268 connected to the bridge rectifier act to supply a regulated negative twenty-four volts to a conductor 269. The pilot lamp 23 is connected across a portion of the secondary winding 264B, and the motor 138 is connected across the lines from the power source 265, and hence they are both energized whenever the power supply is energized.

The bias oscillator 270 provides a high frequency bias current that when mixed with the signal current of the signal oscillator achieves more linear recording characteristics on a magnetic medium than that achieved by just the signal current alone, and this results in an increase in the signal output and a reduction in the distortion of the recorded signals. The bias oscillator includes a resonant circuit comprising a winding 272 and a capacitor 273. The resonant circuit is coupled by a capacitor 274 to the base electrode of transistor 275, and the base electrode is biased by resistors 276 and 277. The current fed to the base electrode is amplified and appears at the emitter electrode where it flows through the parallel combination of a resistor 278 and a capacitor 279 and then through a winding 280. Magnetic coupling between the winding 280 and the winding 272 is used to sustain oscillation, and a diode 282 on the winding 280 regulates the amplitude of the oscillator output.

The bias oscillator 270 is supplied with both regulated and unregulated voltage from the power supply 255. The collector electrode of the transistor 275 receives unregulated voltage through the conductor 257 and the transformer coil 258A while the base electrode of the transistor receives regulated voltage through conductors 269, 285, and 286. Although the power supply is energized when either the call button 15 or the record button 20 is depressed, the operation of the call button shorts out the bias oscillator by connecting the base electrode of the transistor 275 to ground through a conductor 288, the operated call switch 114B, and conductors 289 and 290.

When the record button 20 is depressed, the signals generated by the signal oscillator 218 and the bias oscillator 270 are transmitted by the secondary winding 258B, through a conductor 292, the call switch 114C, a conductor 293, and the switch 45 to one or the other of the transducer heads 67 and 68, which are positioned adjacent to the magnetic drum 47. The signals are also transmitted by the secondary winding through a resistor 295 to the input of an amplifier 296.

The frequency of the bias oscillator is not critical, but it is advantageously at least several times the highest signal frequency generated by the signal oscillator. In addition, for optimum recording, the bias current is at least several times the signal current; and the values of signal and bias current are chosen so that when a new number is recorded on the drum, the number previously recorded is erased.

The amplifier 296 is a conventional three-stage transistorized amplifier that is designed to amplify the particular frequencies of the signal oscillator and not to amplify the bias frequencies imposed by the bias oscillator. When the record button 20 is depressed, the amplifier receives the signals generated by the signal and bias oscillators in the manner described above; and when the call button is depressed, the amplifier receives the signals from the magnetic drum 47, the signals being picked up from the drum by one of the transducer heads 67 and 68 and transmitted to the amplifier through the switch 45, the conductor 293, the operated call switch 114C, a conductor 298, and a capacitor 299.

The output of the amplifier 296 is connected to a primary winding 300A of a transformer 300 and the primary winding is connected to the blanking contacts 165 through conductors 285 and 302. A capacitor 304 is connected across the blanking contacts, and when the contacts are closed, the primary winding is essentially short circuited. When the contacts are open, the short is removed, and a secondary winding 300B of the transformer transmits the ouput of the amplifier to the central office, one side of the telephone line being connected to the secondary winding through a conductor 305, and the other side of the line being connected to the secondary winding through the closed hook switch 211B, conductors 261 and 306, the operated transfer switch 202A, and the conductor 203. A small portion of the amplifier output is supplied to the telephone set through a resistor 308, the operated transfer switch 202B, the conductor 208, the push button switch 134B, and the conductor 209.

Once the repertory dialer is in operation, several control functions are accomplished by a control circuit 310. The control circuit includes a timing element comprising a capacitor 312 connected in parallel with a resistor 313. The timing element is connected through a current limiting resistor 314 to the base electrode of a transistor 316. The emitter electrode of the transistor is connected to a voltage divider network comprising resistors 318, 319, and 320, and the collector electrode of the transistor is connected through a current limiting resistor 322 to the base electrode of a transistor 324. The emitter electrode of the transistor 324 is also connected to the voltage divider network while the collector electrode is connected to one end of, and the base electrode of the transistor 316 is connected to the other end of, a feedback circuit comprising a diode 326 and a resistor 327 in parallel with a capacitor 328. The timing element receives power from the power supply 255 through the conductors 257 and 330, the carriage switch 62, a conductor 332, the delay switch 156, and a conductor 334, while the voltage divider network receives power from the power supply through conductors 257 and 340. Both the timing element and the voltage divider network are connected to ground through conductors 336, 337, and 290.

When the power supply 255 is energized by the operation of the record button 20, a negative potential approximately equivalent to the unregulated voltage of the power supply is stored on the capacitor 312, placing the base electrode of the transistor 316 at the same negative potential. The voltage divider network, on the other hand, maintains the base electrode of the transistor at a rather low negative potential, and since the base electrode is in a more negative condition than the emitter electrode, the transistor does not conduct. When, however, the motor 138 drives through two revolutions and thereby causes the finger portion 151 on the driven gear to rotate the ratchet 153 so as to transfer the delay switch 156, the negative voltage is removed from the capacitor 312 and connected instead through the stepping solenoid 164 to the collector of the transistor 324. The capacitor 312 thereupon commences to discharge to ground through the resistor 313 and the conductors 336, 337, and 290. After the lapse of a predetermined period of time, the base electrode of the transistor 316 becomes more positive than the emitter electrode, whereupon the transistor starts to conduct. The base electrode of the transistor 324 is thereby placed in a more negative condition than its emitter electrode, and it also starts to conduct, energizing the stepping solenoid. The energized stepping solenoid removes the armature 166 from the stepping cam 162, and the motor 138 starts to rotate the magnetic drum 47. When the drum has rotated through a single complete revolution, the pawl 152 on the clutch plate 146 engages and rotates the portion 155 of the ratchet 153 so as to re-transfer the delay switch 156 and thereby open the stepping solenoid circuit and again connect the capacitor 312 to the voltage source. The armature 166 is biased by the spring 167 back into engagement with the stepping cam 162, and the rotation of the magnetic drum is stopped. As explained above in the mechanical description of the operating assembly, a complete revolution of the magnetic drum also allows the advance bar 79 to return to an unactuated position whereby the switch 105 is opened and the power supply is deenergized.

If, before the capacitor 312 discharges to the point where the transistor 316 starts to conduct, one of the push buttons 21 is depressed, as it would be to record information on the magnetic drum, the operation of the switch 134C, which is connected to the capacitor 312 through a conductor 342 and a diode 343, recharges the capacitor by connecting the conductor 342 to the power supply 255 through conductors 261 and 344. The recharging of the capacitor 312 re-initiates the predetermined time period that must elapse before the control circuit operates to shut down the repertory dialer. Furthermore, the operation of the switch 134C causes the magnetic drum 47 to rotate through an increment of a revolution. It does this by charging a capacitor 345 through the conductor 342 and thereby applying a negative pulse to the base electrode of the transistor 324. The negative pulse causes the transistor to conduct momentarily, and the stepping solenoid 164 is thereby energized so as to momentarily withdraw the armature 166 from the stepping cam 162. This permits the motor 138 to rotate the magnetic drum the angular distance between teeth on the stepping cam. Upon the release of the depressed push button 21, the switch 134C returns to its normal position, and the capacitor 345 is discharged through a resistor 346 and a conductor 347.

When a complete telephone number has been recorded on the magnetic drum, or when a mistake is made during the recording of a number, the reset button 19 is depressed thereby closing the reset switch 110. The capacitor 312 is discharged through the switch, and the dialer completes its cycle in the same manner as if the capacitor had discharged over a period of time. A resistor 350 prevents arcing across the contacts of the switch 110.

When the power supply 255 is energized by the operation of the call button 15, the closed switch 114A connects the stepping solenoid 164 to ground through conductors 352, 353, and 290. Then when the motor 138 drives the driven gear 142 through two revolutions and thereby causes the finger portion 151 on the driven gear to rotate the ratchet 153 so as to transfer the delay switch 156, the stepping solenoid is also connected to the power supply. The solenoid is then energized, and the armature 166 is withdrawn from the stepping cam, permitting the magnetic drum 47 to rotate through one complete revolution and then shut down the repertory dialer in the manner described above.

*Operation*

Figure 17:
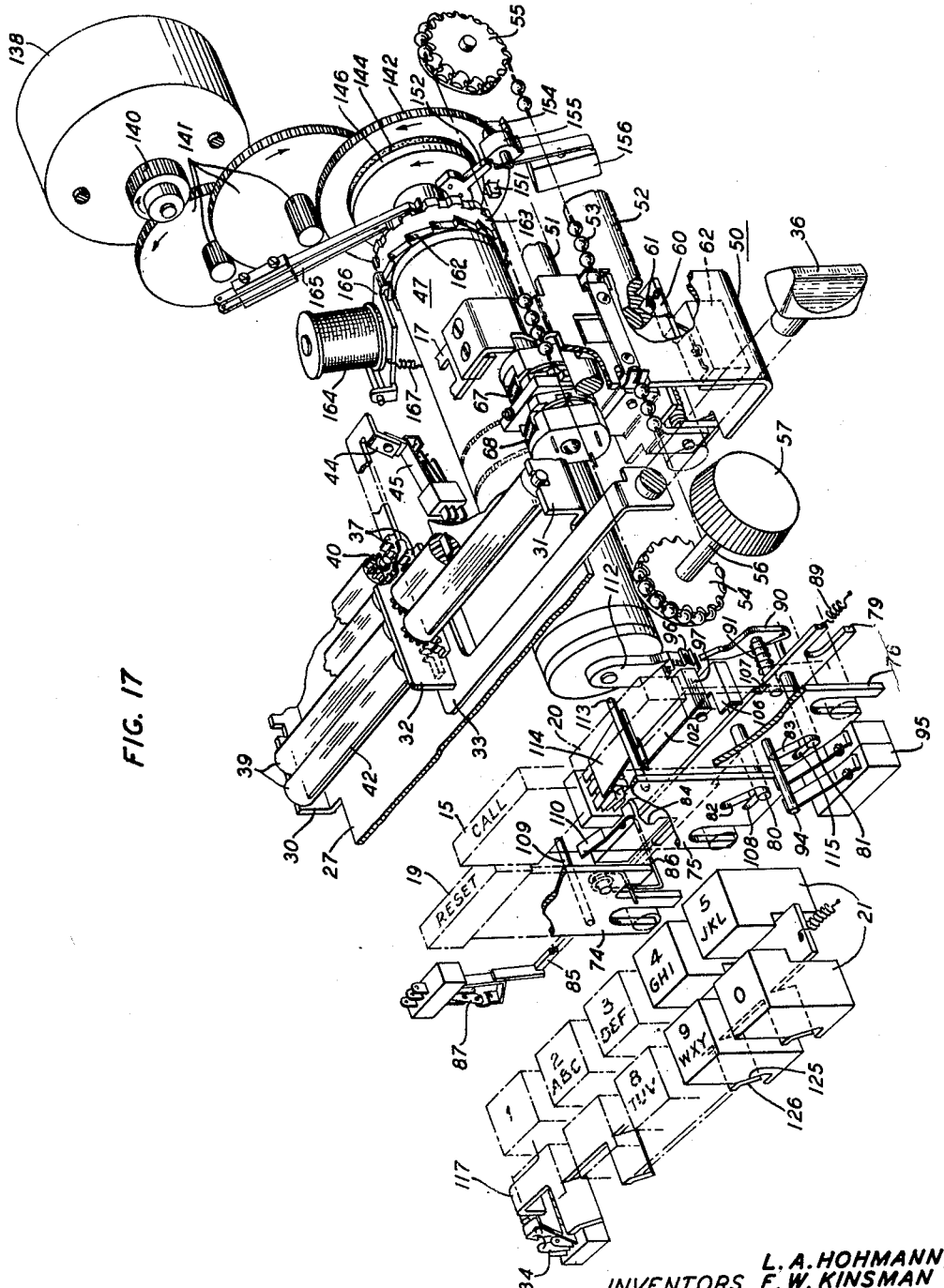
FIG. 17 is a simplified mechanical schematic drawing of this invention.

Dial out cycle: Referring to FIGS. 17, 18, and 19, if the user of the repertory dialer wishes only to dial out with the push button dial, he lifts the handset associated with the repertory dialer and listens for the dial tone. The raised handset permits the hook switches 211A and 211B to close, and the telephone network 200 is connected to the central office through the telephone lines 201. The telephone network is connected to one side of the telephone line directly and connected to the other side of the telephone line through the conductor 209, the push button controlled switch 134B, the conductor 208, the transfer switch 202B, the conductor 207, the diode 206, the conductor 205, the record switch 95B, the conductors 204 and 203, and the transfer switch 202A. In parallel with the diode 206 are the resonant circuits of the signal oscillator 218, and energy derived from the voltage across the diode is stored in the windings 226 and 219 thereof.

If the user hears the dial tone, he proceeds to depress the push buttons 21 corresponding to the digits of the desired telephone number. Each time a push button is depressed, the switch spring 132 associated with the depressed button engages the pair of contacts 135A and 135B associated with the contact spring. This shunts the capacitors 224 and 230 across particular portions of the windings 219 and 226, and a unique pair of resonant frequencies corresponding to the operated push button is established. The depression of the push button also causes the cam face 125 thereof to engage the mating inclined finger 126 of the latch plate 117 and cam the latch plate leftward. The push button controlled switch 134 is thereby actuated so as to open the switch 134A and transfer the switches 134B and 134C. The opening of the switch 134A interrupts the connection between the resonant circuits and the diode 206, and induces in each of the resonant circuits a damped oscillation that shock excites the transistor amplifier of the signal oscillator into operation in the frequencies established by the depressed push button. The transfer of the switch 134B connects the transistor amplifier across the telephone lines 201 and at the same time shunts a low resistance across the telephone network. It does this by connecting the transistor amplifier to one side of the telephone line through the conductor 260, the record switch 95A, the conductor 263, the operated switch 134B, the resistor 262, the conductor 261 and the closed hook switch 211B, the transistor amplifier being connected to the other side of the telephone line through the conductor 205, the record switch 95B, the conductors 204 and 203, and the transfer switch 202A. The signals generated by the signal oscillator are thereby sent to the central office, and there a connection is made with the dialed subscriber. A portion of the signal is developed across the resistor 262 and is transmitted to the telephone receiver 213 by the conductors 209 and 261 so that the tone can be heard by the user. The transfer of the switch 134C provides no function in this cycle.

Call cycle: If the user of the repertory dialer desires to call a subscriber whose number is stored in the dialer, he operates the flipper knob 36 and thus moves the slider 33 so that the racks 37 rotate the name holders 39 so as to display the name of the subscriber. The finger portion 44 of the slider thereby operates the switch 45 so as to connect the transducer head 67 or 68 that is associated with the displayed name into the circuitry of the dialer. The user then rotates the selector knob 57, which is coupled through the shaft 56 to the front sprocket 54, so that the endless bead chain 53 engaging the front and rear sprockets 54 and 55 moves the carriage 50 so as to place the name indicator 17 over the name holder containing the subscriber's name. The interaction between the ball detent 61, which is carried by the carriage cantilever leaf spring 60, and the spaced notches in the bottom surface of the comb 52 tend to assure that the carriage will be positioned so that the activated transducer head registers on the track of the magnetic drum 47 associated with the name holder framed by the name indicator. If the carriage is inadvertently or purposefully placed to either side of this track, the ball detent will rest on a crown between the notches in the comb and deflect the cantilever leaf spring, thereby operating the carriage switch 62 so as to open the connection between the stepping solenoid 164 and the power supply 255. The stepping solenoid cannot then be energized to remove the armature 166 from the stepping cam 162, and the magnetic drum is prevented from rotating.

With the name indicator 17 properly positioned over the name holder 39 containing the name of the subscriber whose number is to be called, the user lifts the handset, thereby connecting the telephone network 200 to the central office in the same manner as described in the dial out cycle. The user listens for the dial tone, and if he hears it, he depresses the call button 15, moving the call plunger 75 downward. The pin 113 mounted on the record plunger actuates the call switch 114, and the angular slot 82 in the call plunger engages the pin 80 on the advance bar 79 and cams the advance bar leftward. The elongated finger portion 85 of the advance bar actuates the power switch 87, and the pawl 90 mounted on the advance bar engages and rotates the ratchet wheel 96 forty-five degrees. An edge of the square cam 97 is thereby brought to bear against the actuator arm 102 and pivot it downward. The finger portion 106 of the actuator arm engages the notch 107 in the advance bar, latching the advance bar in a leftward position and the call plunger in a downward position. The pin 81 on the advance bar is positioned beneath the shoulder 115 of the record plunger 76, and the record button 20 cannot be depressed.

The actuation of the power switch 87 energizes the power supply 255 and the motor 138, and the actuation of the call switch 114 closes the switch 114A and transfers the switches 114B and 114C. The power supply energizes the solenoid 202 through the conductor 261 and thereby operates the transfers witches 202A and 202B. The operated switches short the signal oscillator 218 and connect the secondary winding 300B of the amplifier transformer 300 to the central office, the central office current coming in one side of the telephone line 201 and passing through the closed hook switch 211B, the conductors 261 and 306, the operated switch 202A, the conductor 203, the output coil 300B, and the conductor 305 to the other side of the telephone line. At the same time, the power supply energizes the amplifier 296 by providing the amplifier a regulated negative voltage through the conductors 269 and 285. In addition, the operated call switch 114C connects the activated transducer head to the input of the amplifier by connecting the transducer head through the conductor 293 to the conductor 298.

The power supply also energizes the control circuit 310 and the bias oscillator 270. However, the operated call switch 114A effectively bypasses the control circuit by connecting one side of the stepping solenoid 164 through the conductor 352 to the grounded conductors 353 and 290, and the operated call switch 114B shorts out the bias oscillator by connecting the base electrode of the transistor 275 through the conductor 288 to grounded conductors 289 and 290.

The energized motor 138, acting through the driving gear 140 and the gear train 141, starts the driven gear 142 rotating, and the driven gear, acting through the energy dissipating washers 144 and 145 and the clutch plates 146 and 147, attempts to rotate the magnetic drum 47. The stepping solenoid armature 166, however, engages a tooth on the stepping cam 162 and prevents the magnetic drum from rotating. The driven gear therefore slips between the energy dissipating washers. During each of the first two revolutions of the driven gear, the finger portion 151 thereon engages a tooth on the portion 154 of the ratchet wheel 153 and rotates the ratchet wheel sixty degrees. At the end of the two revolutions, during which time the motor has stabilized at its synchronous speed, a tooth on the portion 155 of the ratchet wheel 153 is positioned so that it actuates the delay switch 156. The actuated delay switch connects the stepping solenoid 164 through the conductor 332, the carriage switch 62, and the conductors 330 and 257 to the power supply. As the other side of the stepping solenoid, due to the action of the call switch 114A, is already connected to ground, the solenoid is energized, and the armature 166 is removed from the stepping cam. The torque of the driven gear is then transmitted by the energy dissipating washers and the clutch plates to the magnetic drum, and the magnetic drum commences to rotate.

As the magnetic drum 47 rotates past the activated transducer head, the signals stored on the drum are picked up by the head and transmitted to the input of the amplifier 296. The amplifier amplifies the particular frequencies of the signal oscillator but does not amplify the bias frequencies imposed by the bias oscillator, and the amplified signals appear at the primary winding 300A of the transformer 300. The secondary winding 300B of the transformer receives the signals from the primary winding and transmits them to the central office. However, portions of the signals are inaccurate since they were recored while the magnetic drum was coming up to the synchronous speed of the motor. These portions are prevented from being transmitted to the central office by the action of the blanking cam 163 opening and closing the blanking contacts 165 as the drum rotates. When the contacts are open, the signals are transmitted out on the line, but when the contacts are closed, the capacitor 304 short circuits the primary winding, and no signals reach the output coil. Besides removing the inaccurate portions of the signal, this blanking action provides an interdigital time between signals. A portion of the output of the transformer is supplied to the telephone receiver 213 through the resistor 308, the operated transfer switch 202B, the conductor 208, the push button switch 134B, and the conductor 209 so that the signals can be heard by the user.

At the completion of one revolution of the magnetic drum 47, the pawl 152 on the clutch plate 146 engages a tooth on the portion 155 of the ratchet wheel 153 and rotates the ratchet sixty degrees. A tooth on the portion 155 no longer actuates the delay switch 156 and the stepping solenoid 164 is deenergized. The solenoid armature 166 is biased by the spring 167 against a tooth on the stepping cam 162, and the rotation of the drum is stopped. At the same time, the pawl 112 secured to the front of the drum engages the ratchet wheel 96 and rotates it forty-five degrees. A flat of the square cam 97 is then presented to the actuator arm 102, and it moves upward, removing the finger portion 106 from the notch 107 in the advance bar 79. The spring 89 moves the advance bar to the right, thereby opening the power switch 87, and the spring associated with the call plunger 75 moves it upward, thereby permitting the call switch 114 to return to its normal position. The transfer switch 202A returns to its normal position, and the telephone network 200 is again connected to the central office so that when the called subscriber answers his phone, the user of the repertory dialer can commence to converse with him.

Record cycle: If the user of the repertory dialer desires to record the number of a subscriber into the dialer, he first transcribes the name of the subscriber onto a properly sized card and inserts the card into the slot 42 in one of the name holders 39. He then rotates the selector knob 57 so that the name indicator 17 frames the name holder containing the name and depresses the record button 20, thereby moving the record plunger 76 downward. The pin 94 mounted on the record plunger actuates the record switch 95 and the angular slot 83 in the record plunger engages the pin 81 on the advance bar 79 and cams the advance bar to the left. In the same manner as when the call button 15 is depressed, the advance bar closes the power switch 87, latches itself in a leftward position, and latches the record plunger in a downward position. The pin 80 on the advance bar is positioned beneath the shoulder 108 in the call plunger 75 and the call button 15 cannot be depressed.

The actuation of the power switch 87 energizes the power supply 255 and the motor 138, and the actuation of the record switch energizes the solenoid 95C and thereby transfers the record switches 95A and 95B. The power supply energizes the control circuit 310 by providing an unregulated negative voltage through the conductors 257 and 340 to the resistors 318, 319, and 320 of the voltage divider network, and through the conductors 257 and 330, the carriage switch 62, the conductor 332, the delay switch 156, and the conductor 334 to the capacitor 312 and resistor 313 of the timing element. The power supply also energizes the bias oscillator 270 by providing an unregulated negative voltage through the conductor 257 to the collector electrode of the transistor 275 and a regulated negative voltage through the conductors 269, 285, and 286 and a resistor 276 to the base electrode of the transistor. Furthermore, the operation of the record switches 95A and 95B energizes the signal oscillator 218 by connecting the power supply through the conductor 257, the transformer 258, and the conductor 259 to one side of the diode 206 through the conductor 260 and the resistor 246, and by connecting the other side of the diode 206 through the conductor 205 to ground.

The energized motor 138, in the same manner as in the call cycle, actuates the delay switch 156 after a slight delay. The power supply is thereby disconnected from the timing element of the control circuit and connected instead to one side of the stepping solenoid 164. The capacitor 312 then starts to discharge to ground through the resistor 313 and the conductors 336, 337, and 290.

The user commences to depress the push buttons 21 corresponding to the digits of the subscriber's telephone number, and each time he depresses a push button the contact spring 132 associated therewith, and the switches 134A, 134B, and 134C are activated. In the same manner as in the dial out cycle, the actuation of the contact spring and the switch 134A causes the signal oscillator to generate a pair of frequencies. The generated frequencies are transmitted through the conductor 260, the operated record switch 95A and the conductor 259 to the primary winding 258A. There they are mixed with the bias frequencies generated by the bias oscillator 270, and the mixed frequencies are transmitted by the secondary winding 258B through the conductor 292, the call switch 114C and the conductor 293 to the activated transducer head. The actuation of the switch 134B performs no function in this cycle, but the actuation of the switch 134C recharges the capacitor 312 in the timing element of the control circuit by connecting the capacitor through the conductor 334, the diode 343, and the conductor 342 to the power supply through the conductors 344 and 261. The operation of the switch 134C also charges the capacitor 345 and thereby applies a negative pulse to the base electrode of the transistor 324. The negative pulse causes the negative transistor to conduct momentarily, and the stepping solenoid 164 is thereby energized so as to momentarily withdrawn the armature 166 from the stepping cam 162. The driven gear 142, acting through the energy dissipating washers 144 and 145 and the clutch plates 146 and 147, starts the magnetic drum rotating. However, the spring 167 immediately biases the armature back against the stepping cam, and thus when the subsequent tooth on the cam engages the armature, the rotation of the magnetic drum is stopped. It is therefore seen that each time a push button is depressed, a combination of signal and bias frequencies are transmitted to an activated transducer head and recorded thereby on magnetic drum as the drum rotates through a predetermined distance. The signals being recorded are so constituted that they automatically erase any previously recorded signals.

Because the power supply 255 energizes the amplifier 296 and the solenoid 202 in the same manner as in the call cycle, the user may, if he desires, call the number at the same time he records it. He does this by simply lifting the handset so as to close the hook switches 211A and 211B. The secondary winding 300B of the amplifier transformer 300 is then connected to the central office, and therefore a portion of the signal being recorded is transmitted by the secondary winding 258B through the resistor 295 to the amplifier. The signals are amplified and transmitted by the transformer 300 to the central office, a portion also being supplied to the telephone receiver.

When a complete telephone number has been recorded or when a mistake is made while recording a number, the reset button 19 is depressed, thereby closing the reset switch 110. The closed switch immediately discharges the capacitor 312 in the timing element of the control circuit 310. The base electrode of the transistor 316 thereby becomes more positive than the emitter electrode and the transistor starts to conduct. This places the base electrode of the transistor 324 in a more negative condition than its emitter electrode and it also starts to conduct. The stepping solenoid 164 is energized, the armature 166 is withdrawn from the stepping cam 162 and the magnetic drum starts to rotate. Since the bias oscillator continues to generate bias frequencies to the activated transducer head, any signals previously recorded on the drum are erased as the drum moves past the activated head. When the drum has rotated through a complete revolution, the dialer shuts down in the same manner as in the call cycle.

If during the recording of a telephone number the user is interrupted, the capacitor 312 in the timing element of the control circuit 310 will after a predetermined period of time discharge to the point where the transistor 316 conducts, thereby shutting down the repertory dialer in the same manner as if the reset button 19 had been depressed.

It is to be noted that should a local power failure occur while the repertory dialer is in a call or record cycle, the dialer can still be used to dial out. This is true because the transfer switch 202A and the record switches 95A and 95B, which act to disconnect the signal oscillator from the central office in one or both of these cycles, are respectively operated by the solenoids 202 and 95C. Therefore when a power failure occurs, the solenoids are deenergized and the switches return to their normal positions whereby the signal oscillator 218 is again connected to the central office.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A repertory dialer comprising dialing means for generating alternating current signals of different frequencies, a multichannel storage medium, transducer means for recording signals generated by the dialing means on the storage medium and for reproducing signals previously recorded on the storage medium, drive means for moving the storage medium, amplifying means having an input and an output, a manual recording control, a manual reproducing control, means responsive to the operation of the recording control for connecting the dialing means to the transducer means and the input of the amplifying means and connecting the output of the amplifying means to a telephone line, means responsive to the operation of the recording control and each operation of the dialing means for permitting the drive means to move the storage medium through a constant distance, the movement of the storage medium commencing from an initiating point, means responsive to the operation of the recording control and the nonoperation of the dialing means for a predetermined period of time for permitting the drive means to return the storage medium to the initiating point, means for preventing the drive means from moving the storage medium when the transducer means is not positioned in alignment with one of the channels of the storage medium, means responsive to the operation of the reproducing control for connecting the transducer means to the input of the amplifying means and connecting the output of the amplifying means to the telephone line, and means responsive to the operation of the reproducing control for blanking out inaccurate portions of the signals reproduced by the transducer means and providing a silent interval between signals sent out on the telephone line.

2. A repertory dialer comprising dialing means for generating alternating current signals of different frequencies, a manual recording control, a multichannel storage medium, a stepping cam fixedly secured to the storage medium, the stepping cam having teeth equally spaced around the periphery thereof, drive means for rotating the stepping cam and the storage medium, clutch means intermediate the drive means and the storage medium, a solenoid having an armature normally biased into engagement with the teeth on the stepping cam, the armature when engaging the stepping cam preventing the movement of the storage medium, means responsive to the operation of the recording control and each operation of the dialing means for energizing the solenoid to momentarily remove the armature from the stepping cam, permitting the drive means to rotate the storage medium through the angular distance between teeth on the stepping cam, the movement of the storage medium commencing from an initiating point, and means responsive to the operation of the recording control and the nonoperation of the dialing means for a predetermined period of time for energizing the solenoid to remove the armature from the stepping cam until the drive means rotates the storage medium to the initiating point.

3. The repertory dialer as in claim 2 further including transducer means for recording signals generated by the dialing means on the storage medium and for reproducing signals previously recorded on the storage medium, and means for preventing the energization of the solenoid when the transducer means is not in alignment with one of the channels of the storage medium.

4. A repertory dialer comprising dialing means, a multichannel storage medium, drive means for moving the storage medium, a manual recording control, means responsive to the operation of the recording control and each operation of the dialing means for permitting the drive means to move the storage medium through a constant distance, the movement of the storage medium commencing from an initiating point, and means responsive to the operation of the recording control and the nonoperation of the dialing means for a predetermined period of time for permitting the drive means to move the storage medium to the initiating point.

5. The repertory dialer as in claim 4 further including transducer means for recording signals generated by the dialing means on the storage medium and for reproducing signals previously recorded on the storage medium, amplifying means having an input and an output, and means responsive to the operation of the recording control for connecting the dialing means to the transducer means and the input of the amplifying means and connecting the output of the amplifying means to a telephone line.

6. A repertory dialer comprising dialing means for generating signals, a multichannel storage medium, transducer means for recording on the storage medium signals generated by the dialing means and for reproducing signals previously recorded on the storage medium, drive means for moving the storage medium, and means for preventing the drive means from moving the storage medium when the transducer means is not positioned in alignment with one of the channels of the storage medium.

7. A repertory dialer comprising dialing means for generating alternating current signals of different frequencies, a multichannel storage medium, transducer means for recording on the storage medium signals generated by the dialing means and for reproducing signals previously recorded on the storage medium, means for providing relative movement between the transducer means and the storage medium, a recording control and a reproducing control, means responsive to the operation of the recording control for connecting the dialing means to the transducer and for activating the moving means, amplifying means having an input and an output, means responsive to the operation of the reproducing control for connecting the transducer means to the input of the amplifying means and for connecting the output of the amplifying means to a telephone line, and means responsive to the operation of the reproducing control for blanking out inaccurate portions of the signals reproduced by the transducer means and providing a silent interval between signals sent out on the telephone line.

8. The repertory dialer as in claim 7 wherein the means for blanking and providing an interval comprises a blanking cam and blanking contacts associated with the cam, the cam actuating the contacts to short out the output of the amplifying means during the initial portion of each signal.

References Cited in the file of this patent

UNITED STATES PATENTS

| | | |
|---|---|---|
| 2,363,671 | Hubbard | Nov. 28, 1944 |
| 2,701,279 | Lovell | Feb. 1, 1955 |
| 2,761,899 | Keith | Sept. 4, 1956 |
| 2,827,515 | Zuber | Mar. 18, 1958 |
| 2,941,043 | Ham | June 14, 1960 |